US009699503B2

(12) United States Patent
Fishman et al.

(10) Patent No.: US 9,699,503 B2
(45) Date of Patent: Jul. 4, 2017

(54) SMART PLAYLIST

(75) Inventors: Alex Fishman, San Francisco, CA (US); Crx K. Chai, Oakland, CA (US)

(73) Assignee: OpenTV, Inc., San Francisco, CA (US)

( * ) Notice: Subject to any disclaimer, the term of this patent is extended or adjusted under 35 U.S.C. 154(b) by 331 days.

(21) Appl. No.: 12/877,034

(22) Filed: Sep. 7, 2010

(65) Prior Publication Data
US 2012/0060195 A1    Mar. 8, 2012

(51) Int. Cl.
H04N 21/4788  (2011.01)
H04N 21/442   (2011.01)
H04N 21/25    (2011.01)
H04N 21/466   (2011.01)
H04N 21/482   (2011.01)

(52) U.S. Cl.
CPC ..... H04N 21/44204 (2013.01); H04N 21/252 (2013.01); H04N 21/4668 (2013.01); H04N 21/4826 (2013.01)

(58) Field of Classification Search
CPC ........... G06F 17/3002; G06F 17/30035; G06F 17/30038; H04N 21/252; H04N 21/4668
USPC .................................................. 725/46, 47
See application file for complete search history.

(56) References Cited

U.S. PATENT DOCUMENTS

| | | | |
|---|---|---|---|
| 5,798,785 A * | 8/1998 | Hendricks et al. | 725/46 |
| 8,949,871 B2 | 2/2015 | Chai et al. | |
| 2003/0037334 A1 * | 2/2003 | Khoo et al. | 725/46 |
| 2003/0093790 A1 * | 5/2003 | Logan | G06F 17/30265 725/38 |
| 2003/0217365 A1 * | 11/2003 | Caputo | H04N 7/106 725/95 |
| 2003/0237093 A1 | 12/2003 | Marsh et al. | |
| 2005/0144499 A1 | 6/2005 | Narahara et al. | |
| 2007/0033607 A1 | 2/2007 | Bryan | |
| 2007/0041705 A1 | 2/2007 | Bontempi | |
| 2007/0157242 A1 | 7/2007 | Cordray et al. | |
| 2008/0117202 A1 * | 5/2008 | Martinez | G06F 17/30035 345/418 |
| 2008/0222106 A1 | 9/2008 | Rao et al. | |
| 2008/0320517 A1 | 12/2008 | Beadle et al. | |

(Continued)

FOREIGN PATENT DOCUMENTS

| | | |
|---|---|---|
| EP | 0262757 A2 | 4/1988 |
| WO | WO-0232136 A2 | 4/2002 |

OTHER PUBLICATIONS

"U.S. Appl. No. 12/877,993, Response filed Dec. 3, 2012 to Non Final Office Action mailed Aug. 2, 2012", 17 pgs.

(Continued)

Primary Examiner — Nathan Flynn
Assistant Examiner — Tung T Trinh
(74) Attorney, Agent, or Firm — Schwegman Lundberg & Woessner, P.A.

(57) ABSTRACT

A smart playlist system is described. In one example embodiment, a collector module obtains content utilization data from a plurality of client devices associated with respective plurality of viewers. A hot list generator module generates a list of popular content items based on the obtained content utilization data. A customization module generates a customized playlist for a target viewer from the plurality of viewers, based on the list of popular content items and a profile of the target viewer. The communications module communicates the customized playlist to a client device of the target viewer.

18 Claims, 5 Drawing Sheets

(56) References Cited

U.S. PATENT DOCUMENTS

| | | | |
|---|---|---|---|
| 2009/0083326 A1* | 3/2009 | Pelton | G06F 17/30053 |
| 2009/0100469 A1* | 4/2009 | Conradt | H04N 7/17318 |
| | | | 725/46 |
| 2009/0150786 A1* | 6/2009 | Brown | G06F 17/30035 |
| | | | 715/733 |
| 2009/0210902 A1 | 8/2009 | Slaney et al. | |
| 2009/0217324 A1 | 8/2009 | Massimi | |
| 2010/0058241 A1 | 3/2010 | Saijo et al. | |
| 2011/0060649 A1* | 3/2011 | Dunk | G06F 17/3002 |
| | | | 705/14.53 |
| 2011/0145040 A1 | 6/2011 | Zahn et al. | |
| 2015/0121406 A1 | 4/2015 | Chai et al. | |

OTHER PUBLICATIONS

"U.S. Appl. No. 12/878,001, Response filed Nov. 9, 2012 to Non Final Office Action mailed Aug. 9, 2012", 11 pgs.
U.S. Appl. No, 12/877,993, filed Sep. 8, 2010, System and Method for Displaying Information Related to Video Programs in a Graphical User Interface.
U.S. Appl. No. 12/877,875, filed Sep. 8, 2010, Smart Media Selection Based on Viewer User Presence.
U.S. Appl. No. 12/878,001, filed Sep. 8, 2010, Collecting Data From Different Sources.
"U.S. Appl. No. 12/877,875 , Response filed Mar. 11, 2013 to Non Final Office Action mailed Nov. 6, 2012", 10 pgs.
"U.S. Appl. No. 12/877,875, Advisory Action mailed Aug. 2, 2013", 3 pgs.
"U.S. Appl. No. 12/877,875, Final Office Action mailed Apr. 23, 2013", 12 pgs.
"U.S. Appl. No. 12/877,993, Final Office Action mailed Mar. 15, 2013", 30 pgs.
"U.S. Appl. No. 12/877,993, Response filed Jul. 22, 2013 to Final Office Action mailed Mar. 15, 2013", 17 pgs.
"U.S. Appl. No. 12/878,001 , Response filed Aug. 23, 2013 to Final Office Action mailed Mar. 29, 2013", 12 pgs.
"U.S. Appl. No. 12/878,001, Examiner Interview Summary mailed Jul. 24, 2013", 3 pgs.
"U.S. Appl. No. 12/878,001, Final Office Action mailed Mar. 29, 2013", 13 pgs.
"International Application Serial No. PCT/US2011/50712, International Preliminary Report on Patentability mailed Mar. 21, 2013", 8 pgs.
"International Application Serial No. PCT/US2011/50839, International Preliminary Report on Patentability mailed Mar. 21, 2013", 6 pgs.
Chai, Crx K., "U.S. Appl. No. 12/877,875 / Smart Media Selection Based on Viewer User Preference", 11.
"U.S. Appl. No. 12/877,875, Non Final Office Action mailed Apr. 15, 2014", 13 pgs.
"U.S. Appl. No. 12/877,875, Response filed Jul. 16, 2013 to Final Office Action mailed Apr. 23, 2013", 11 pgs.
"U.S. Appl. No. 12/878,001, Response filed Apr. 1, 2014 to Non Final Office Action mailed Oct. 3, 2013", 13 pgs.
"Australian Application Serial No. 2011101152, Examination Report No. 1 mailed May 6, 2013", 4 pgs.
"Australian Application Serial No. 2011101152, Response filed Sep. 17, 2013 to Examination Report No. 1 mailed May 6, 2013", 13 pgs.
"Australian Application Serial No. 2011299234, Amendment filed Apr. 4, 2013", 11 pgs.
"U.S. Appl. No. 12/878,001, Non Final Office Action mailed Oct. 3, 2013", 12 pgs.
"U.S. Appl. No. 12/877,875, Non Final Office Action mailed Nov. 6, 2012", 13 pgs.
"U.S. Appl. No. 12/877,875, Notice of Allowance mailed Sep. 17, 2014", 12 pgs.
"U.S. Appl. No. 12/877,875, Response filed Aug. 15, 2014 to Non Final Office Action mailed Apr. 15, 2014", 12 pgs.
"U.S. Appl. No. 12/877,993, Appeal Brief filed Feb. 24, 2016", 20 pgs.
"U.S. Appl. No. 12/877,993, Final Office Action mailed Jan. 28, 2015", 35 pgs.
"U.S. Appl. No. 12/877,993, Non Final Office Action mailed Jun. 20, 2014", 31 pgs.
"U.S. Appl. No. 12/877,993, Response filed Oct. 14, 2014 to Non Final Office Action mailed Jun. 20, 2014", 19 pgs.
"U.S. Appl. No. 12/878,001, Final Office Action mailed Jul. 17, 2014", 12 pgs.
"U.S. Appl. No. 12/879,001, Appeal Brief filed May 12, 2015", 16 pgs.
"U.S. Appl. No. 14/588,871, Final Office Action mailed Mar. 7, 2016", 12 pgs.
"U.S. Appl. No. 14/588,871, Non Final Office Action mailed Jun. 29, 2015", 13 pgs.
"U.S. Appl. No. 14/588,871, Non Final Office Action mailed Sep. 9, 2016", 12 pgs.
"U.S. Appl. No. 14/588,871, Non Final Office Action mailed Sep. 15, 2016", 16 pgs.
"U.S. Appl. No. 14/588,871, Preliminary Amendment filed Jan. 27, 2015", 8 pgs.
"U.S. Appl. No. 14/588,871, Response filed Jan. 17, 2017 to Non Final Office Action mailed Sep. 15, 2016", 20 pgs.
"U.S. Appl. No. 14/588,871, Response filed Jul. 7, 2016 Final Office Action mailed Mar. 7, 2016", 12 pgs.
"U.S. Appl. No. 14/588,871, Response filed Oct. 29, 2015 to Non Final Office Action mailed Jun. 29, 2015", 11 pgs.
"Australian Application Serial No. 2011299221, Response filed Jan. 15, 2015", 19 pgs.
"Australian Application Serial No. 2011299234, Amendment filed Aug. 25, 2015", 26 pgs.
"Australian Application Serial No. 2011299234, First Examiner Report mailed Aug. 25, 2014", 3 pgs.
"Australian Application Serial No. 2011299234, Response filed Oct. 26, 2015 to Subsequent Examiners Report mailed Sep. 4, 2015", 3 pgs.
"Australian Application Serial No. 2011299234, Subsequent Examiners Report mailed Sep. 4, 2015", 4 pgs.
"Australian Application Serial No. 2016201377, First Examiner Report mailed Feb. 1, 2017", 3 pgs.
"Australian Serial No. 2011299221, First Examiner Report mailed May 2, 2014", 3 pgs.
"Brazilian Application Serial No. BR1120130055251, Voluntary Amendment filed Sep. 8, 2014", 7 pgs.
"European Application Serial No. 11824132.2, Extended European Search Report mailed Feb. 25, 2014", 6 pgs.
"European Application Serial No. 11824132.2, Response filed Aug. 29, 2014", 12 pgs.
"Australian Application Serial No. 2016201377, Response filed May 25, 2017 to First Examiner Report mailed Feb. 1, 2017", 55 pgs.
"U.S. Appl. No. 12/877,993, Advisory Action mailed May 8, 2017", 9 pgs.
"U.S. Appl. No. 12/878,001, Appeal Decision mailed Mar. 20, 2017", 10 pgs.
"U.S. Appl. No. 14/588,871, Final Office Action mailed Mar. 31, 2017", 17 pgs.

* cited by examiner

SMART PLAYLIST

TECHNICAL FIELD

This application relates to the fields of media and entertainment and specifically to a smart playlist system.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

In the field of media and entertainment, there is a new generation of viewers that has a high expectation of the level of entertainment to be enjoyed from various sources of content, such as, e.g., television programming, the Internet, and locally stored content. These viewers may expect more choice, more flexibility, as well as the ability to interact and participate more with the viewable content.

On the other hand, the sheer volume of content that is available for viewing is exploding dramatically. Just the number of television channels that are now available is almost unmanageable. The amount of content that is available via free video or video on demand service is also increasing. It is now possible to view content over a wider span of time by employing time shifting technologies, such as Personal Video Recording (PVR) (sometimes referred to as DVR or Digital Video Recording). This explosion of content may be described as a paradox of choice, where the excess of choices causes a viewer's inability to choose.

BRIEF DESCRIPTION OF DRAWINGS

Embodiments are illustrated by way of example and not limitation in the figures of the accompanying drawings, in which like references indicate similar elements and in which.

DETAILED DESCRIPTION

Figure 1:
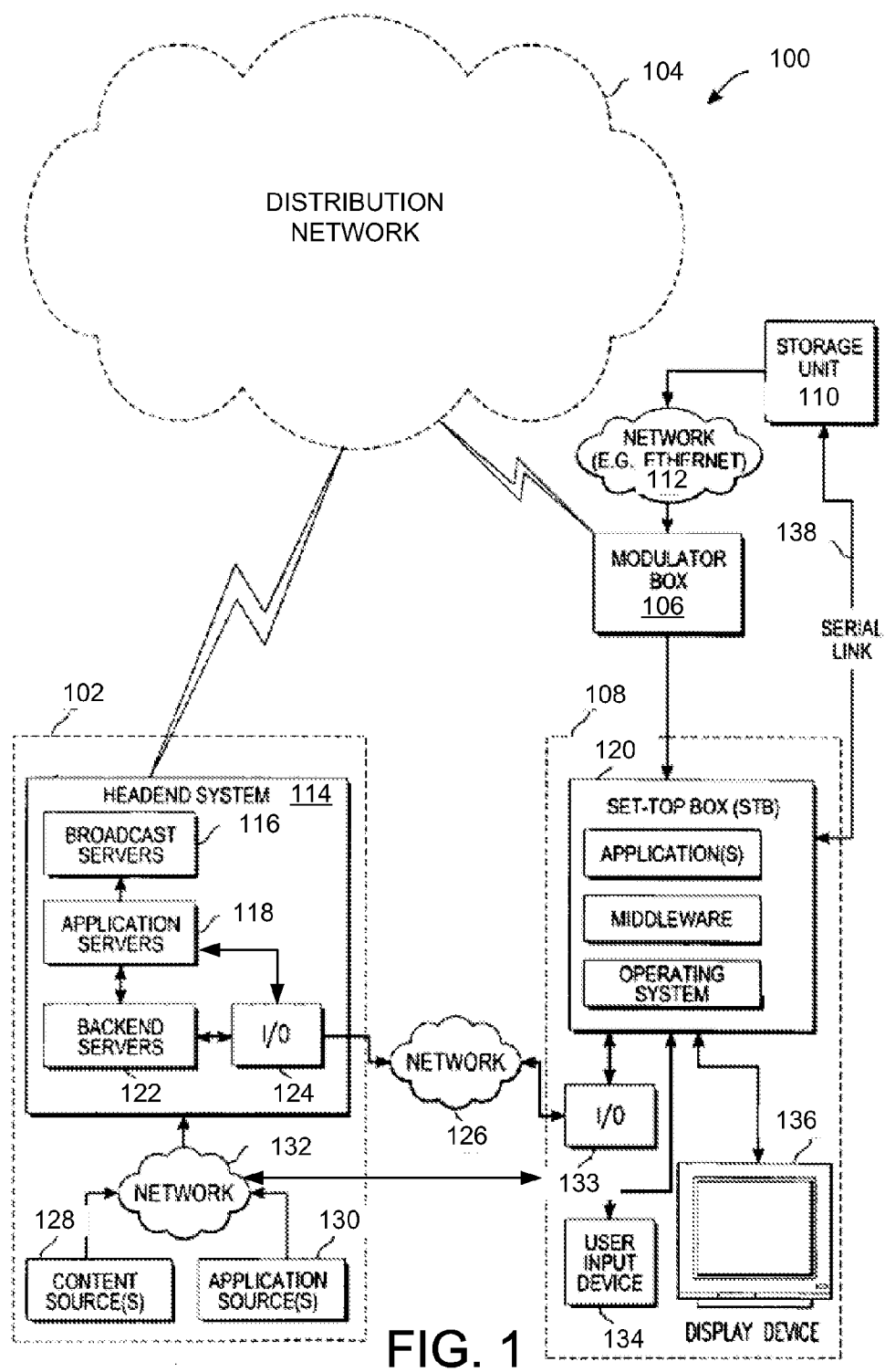
FIG. 1 illustrates an environment within which an example smart playlist may be implemented, in accordance with an example embodiment.

The description that follows includes systems, methods, techniques, instruction sequences, and computing machine program products that embody illustrative embodiments of the present invention. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures, and techniques have not been shown in detail.

A system is described to collect information from a great number of viewers' client devices, determine a list of popular content items based on the collected information, customize the list for a particular viewer, and send that list to the viewer's device. This approach to aiding a viewer in making choices in the universe of viewable content may be termed a smart playlist system. Example embodiments described herein provide systems and methods to generate a smart play list.

In one embodiment, a smart playlist system obtains from viewers' client devices content-related information such as, e.g., which programs are being currently viewed, which programs are being recorded and scheduled to be recorded, which content has been rated and the associated ratings, as well as recommendations pertaining to programs, purchases of various programs, etc. For the purposes of this description the terms content, content item, show, and program will be understood to denote viewable content. Data collected indiscriminately from the entire accessible community of viewers may be accumulated in a repository termed a global bucket. Data from the global bucket may be analyzed to determine programs that appear to be most popular at the time of the analyzing, i.e., appear to be of heightened interest to viewers. A certain number of programs that have been determined as most popular are compiled into a so-called hot list. The hot list may be made available to viewer, e.g., by communicating the list to the viewers' client devices or providing an access link that can be invoked from the users' devices.

Before a hot list is provided to a viewer, it may be personalized for the viewer by determining how relevant the items in the hot list are to that particular viewer and presenting to the viewer only those programs that have been determined to be of high relevance to the viewer. The relevancy of a particular program to a particular viewer may be determined by associating each item in the hot list with a score based on the viewer's profile, on the viewer's content viewing history and patterns, as well as based on information collected from the client devices of a subset of viewers who are members of the particular viewer's social network.

In one example embodiment, in addition to determining a personalized hot list of content items, a smart playlist system may trigger recording of a certain program as soon as the program has been identified as a live program and of high relevance to the viewer. For example, a viewer may not be tuned into a channel broadcasting a particular live sports event. If the smart playlist system determined that the live sports event is of high relevance to the viewer, the smart playlist system may trigger the recording of the live broadcast of the sports event on the viewer's client device (e.g., a set top box, a desktop computer, etc.) and also alerts the user to the fact that she may be interested in the event being currently broadcast on a certain channel. The viewer may then ignore the alert. If the viewer, instead, tunes to the suggested channel the viewer would not have missed the beginning of the broadcast because the recording of the program has been automatically triggered by an instruction provided to the viewer's client device from the smart playlist system. In one example, the high relevancy of the live broadcast may have been determined based on the fact that all of the viewer's social network contacts have either tuned into the associated channel or have scheduled the recording of the broadcast. In another example, the high relevancy of the live broadcast may have been determined based on the viewer's profile or on the viewer's viewing history. An example smart playlist system may be implemented within architecture illustrated in FIG. 1.

FIG. 1 illustrates network architecture of an example interactive media environment 100 wherein some embodiments of the present invention may be deployed. The interactive media environment 100 includes a source system 102 that communicates data (e.g., media content data and interactive application data) via a distribution network or system 104 (e.g., the Internet, a mobile communication network, or any other network capable of communicating digital data) and a modulator box 106 to a receiver system 108. In one example embodiment, the interactive media environment 100 optionally includes a storage unit 110 (e.g., personal computer) that communicates stored data via a network 112 to the modulator box 106 which, in turn, communicates the stored data, media content data, and interactive application data to the receiver system 108. The modulator box 106, storage unit 110, and the receiver system 108 may be co-located in a user's home. Thus, in one embodiment, the modulator box 106 may combine media content data and interactive application data received from the remote source system 102 with a local stored data provided by the storage unit 110 provided at the user's home.

Turning first to the source system 102, an example headend system 114 operates to communicate the data as a broadcast transmission. To this end, the headend system 114 is shown to include one or more broadcast servers 116 and, optionally, one or more application servers 118. Each of the broadcast servers 116 may operate to receive, encode, packetize, multiplex, modulate, and broadcast data from various sources and of various types. While the example embodiment is described herein as transmitting data from the headend system 114 as a broadcast, it will be appreciated that the relevant data could also be unicast or multicast from the source system 102 via the distribution system 104 and modulator box 106 to the receiver system 108. In various embodiments, data could also be transmitted from the source system 102 via a network connection to the receiver system 108. Further, in other example embodiments the source system 102 may be modified to facilitate communications via the Internet, a mobile phone network, or any other network capable of communicating digital data.

Each application server 118, in one example embodiment, compiles and provides interactive data modules to the broadcast server 116. The interactive data modules may also include data that is utilized by an interactive television application. The application server 118 may also include multiplexing functionality to enable multiplexing of, for example, interactive television applications and associated data with audio and video signals received from various sources. The application server 118 may also have the capability to feed (e.g., stream) multiple interactive television applications to one or more broadcast servers 116 for distribution to the receiver system 108. To this end, each application server 118 may implement a so-called "carousel," whereby code and data modules are provided to a broadcast server 116 in a cyclic, repetitive manner for inclusion within a transmission from the headend system 114. In other embodiments, code may reside permanently in a set-top box (STB) 120 (e.g., the code may be stored in non-volatile memory of the STB 120), may be pushed of downloaded to the STB 120, or be provided to the STB 120 in any other manner. In one embodiment, the application server 118 provides a smart playlist mechanism to collect information from viewers, determine a list of popular content items, customizing the list for a particular user and sending that lit to the user's device. The smart playlist mechanism will be discussed by way of example in more detail in connection with FIGS. 2-4.

The headend system 114 is also shown, by way of example, to include one or more backend servers 122, which are coupled to the application servers 118 and to an input/output device 124 (e.g., a modem pool). Specifically, the I/O device 124 is coupled to receive data from the receiver system 108 via a network 126 (e.g., the Internet) and to provide this data to backend servers 122. The backend servers 122 may then provide the data, received from the receiver system 108, to the application servers 118 and the broadcast servers 116. Alternatively, data received from the receiver system 108 may be directly provided to the application servers 118.

Accordingly, the network 126 and the I/O device 126 may operate as a return channel whereby the receiver system 108 is provided with interactivity with the source system 102. Data provided to the headend system 114 via the return channel may include, merely for example, user input to an interactive media application executed at the receiver system 108 or data that is generated by the receiver system 108 and communicated to the source system 102. The return channel may also provide a channel whereby programs, targeted advertisements/commercials, and applications from the source system 102 are provided to the receiver system 108.

Within the source system 102, the headend system 114 is also shown optionally to receive data (e.g., content, code, and application data) from external sources. For example, the headend system 114 may be coupled to one or more content sources 128 and one or more application sources 130 via a network 132 (e.g., the Internet). For example, a content source 128 may be a provider of entertainment content (e.g., movie), a provider of real-time dynamic data (e.g., weather information), and the like. The application source 130 may be a provider of any interactive media application. For example, one or more application sources 130 may provide a TV media player application, electronic program guide and navigation applications, messaging and communication applications, information applications, and so forth. The application sources 130 may be configured to execute on different client devices (e.g., mobile phones, personal computer, STBs, or the like).

Turning now to the example distribution system 104, the distribution system 104 may, in one embodiment, support the broadcast distribution of data from the source system 102 to the receiver system 108. As shown, the distribution network or system 104 may comprise a satellite, cable, terrestrial or Digital Subscribers Line (DSL) network, or any other data communication network or combination of such networks.

The receiver system 108 is shown, in one example embodiment, to include the set-top box (STB) 120 that receives data (e.g., primary and secondary content streams) via the distribution system 104 and modulator box 106 and an input/output device 132 (e.g., modem) for return channel communications with the headend system 114. The receiver system 108 is also shown to include other optional external systems such as a user input device 134 (e.g., a keyboard, remote control, mouse etc.) and a display device 136, coupled to the set-top box 120, for the display of content received at the set-top box 120. In one example embodiment, the display device 136 may be a television set.

The modulator box 106, in one example embodiment, receives stored data from the storage unit 110 and a broadcast transmission from the source system 102. The modulator box 106 multiplexes the stored data into the broadcast transmission thereby generating a second transmission that is communicated to the receiving system 108. It will, however, be appreciated that storage unit functionality is optional. The storage unit 110 may store data and, upon request, communicate the stored data to the modulator box 106 over the network 112 (e.g., Ethernet). The storage unit 110 may communicate the stored data in response to commands that are entered by a user from the set-top box 120 and communicated to the storage unit 110 over a link 138.

It will be appreciated to one skilled in the art that one or more of the modules, applications, or the like of the modulator box 106, the set-top box 120, and the storage unit 110 may be combined or integrated. In general, components, protocols, structures, and techniques not directly related to functions of example embodiments have not been shown or discussed in detail. The description given herein simply provides a variety of example embodiments to aid the reader in an understanding of the systems and methods used herein. While the interactive media environment 100 is illustrated having a receiving system 108 including a set-top box 120, it is noted that the receiving system 108 may comprise a mobile device or a personal computer coupled to a network for receiving media.

Smart playlist may be utilized beneficially in the context of a network environment. FIG. 1 illustrates an environment 100 within which an example smart playlist may be implemented. The environment 100 includes a set top box 110 in communication with an entertainment display device 120 and a control device 130. The set-top box (STB) 110 may be a device that connects to a television and an external source of signal, turning the signal into content which can then be displayed on the television screen. In one example embodiment, the entertainment display device 120 is a television set, and the control device 130 is a remote control device that may be used for switching between television channels, for example. The set-top box 110 may be configured to include a system 112 to provide a smart playlist that may include features outlined above. The set-top box 110 may be configured to receive content from sources such as, e.g., an Ethernet cable, a satellite dish, a coaxial cable, a telephone line (including digital subscriber line (DSL) connections), Broadband over Power Line, as well as very high frequency (VHF) or ultra high frequency (UHF) antenna. Content, in this context, could mean any or all of video, audio, Internet web pages, interactive games, or other possibilities. As shown in FIG. 1, the set-top box 110 is shown as having access to signal sources 140, including broadcast programming 142, video on demand programs 144, as well as to local content 146 and Internet content 148.

Figure 2:
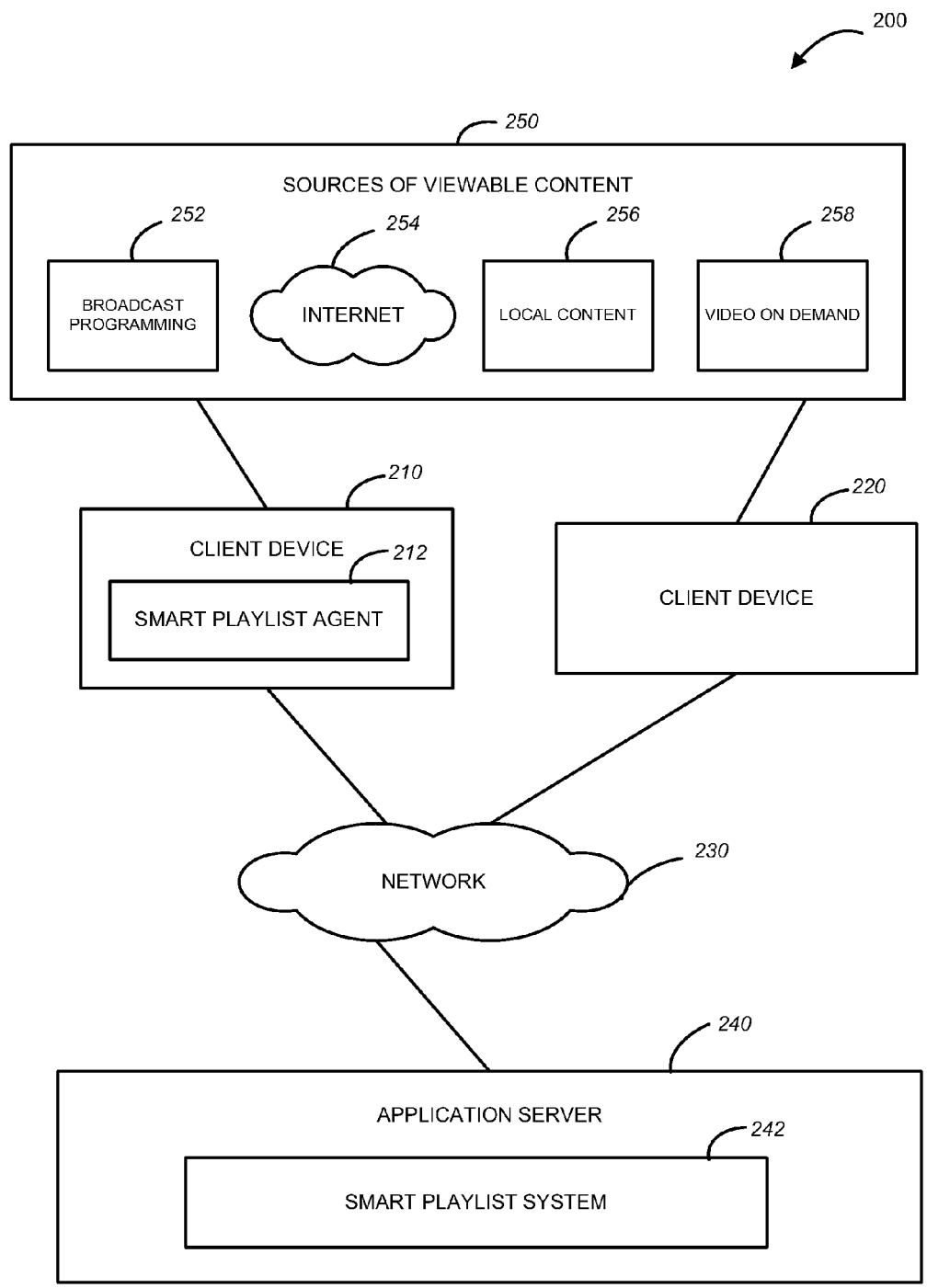
FIG. 2 is a network diagram illustrating architecture within which a smart playlist may be utilized, in accordance with an example embodiment.

FIG. 2 is a network diagram illustrating architecture 200 within which a smart playlist may be utilized, in accordance with an example embodiment. The architecture 100 includes a client device 210 and a client device 220, each configured to receive content from content sources 250 and to be in communication with a server system 240 via a communications network 230. The client devices 210 and 220 may be set top boxes, desktop computers, mobile devices, etc. The communications network 230 may be a public network (e.g., the Internet, a wireless network, etc.) or a private network (e.g., a local area network (LAN), a wide area network (WAN), Intranet, etc.). The server 240 may include a smart playlist system 242 configured to collect information related to utilization of viewable content from viewers' client devices, to aggregate and customize the collected information, and to provide the resulting hot list to viewers personalized for each particular user, as was described above.

The client device 210 may be configured to include a smart playlist agent 212 that may be configured to cooperate with the smart playlist system 242 with respect to collecting information regarding viewable content accessed or referenced on the client device 210. In some embodiments, the smart playlist system 242 may be configured to obtain information regarding viewable content accessed or referenced on a client device without the use of a smart playlist agent. As shown in FIG. 2, the client devices 210 and 220 have access to signal sources 250. The signal sources 250 include broadcast programming 252, video on demand programs 254, as well as to local content 256 and Internet content 258. An example system to generate a smart playlist may be described with reference to FIG. 2.

Figure 3:
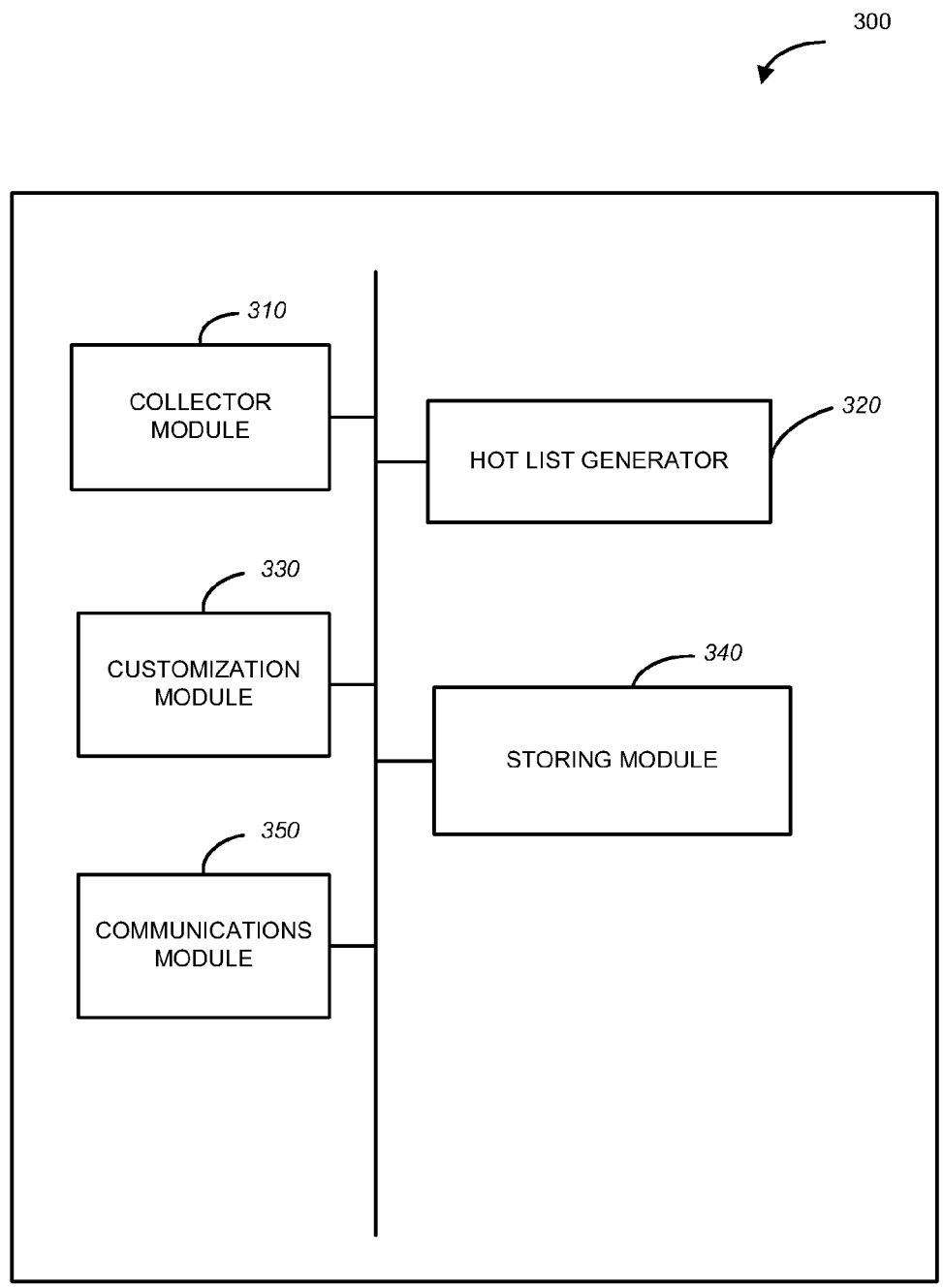
FIG. 3 is a block diagram illustrating a smart playlist system, in accordance with an example embodiment.

FIG. 3 illustrates an example system 300 to generate a smart playlist based on content utilization information collected from client devices of the entire community of users that can be accessed by the smart playlist system. The system 300 includes a collector module 310, a hot list generator 320, a customization module 340, and a communications module 350. The collector module 310 may be configured to obtain content utilization data from a plurality of client devices (e.g., the client devices 210 and 220 of FIG. 2. The content utilization data for a viewer from the plurality of viewers may be indicative of the viewer's interest in respective content items. In one embodiment, the collector module 310 obtains content utilization data from a real time listener provided at a client device, e.g., the smart playlist agent 212 of FIG. 2. The hot list generator 320 may be configured to generate a list of popular content items based on the obtained content utilization data.

The collector module 310 obtains content utilization information from all client devices accessible to the smart playlist system 300. This information, collected from the entire universe of viewers that have diverse tastes, viewing habits, and content source preferences and that reflects content utilization of the entire viewing community, is stored, by a storing module 340, in a repository termed a global bucket. The data from the global bucket is analyzed by the hot list generator 320 to determine those content items that are of most interest to the global community of viewers and assemble those content items into a list of popular items, a so-called hot list. In one embodiment, the hot list generator 320 may generate a hot list based on how many viewers are watching or recording a show, the duration of the watching, ratings and recommendations associated with the program, and so on. As the collector module 310 continuously obtains content utilization data from client devices, the hot list generator 320 may be configured to continuously update the hot list, e.g., once a day or based on any predetermined time period.

The customization module 330 may be configured to customize the hot list that is generated based on the information from the global bucket that reflect preferences of the entire community of viewers to target more closely the actual and projected preferences of a particular viewer (a target viewer) and generate a so-called customized playlist. The customizing may be based on the viewer's profile that may be stored at the application server 240 of FIG. 2, as well as on the viewing history of the viewer and the viewing history of members of the viewer's social network. In one embodiment, the storing module 340 stores content utilization data for individual viewers in respective repositories termed personal buckets. A viewer's profile stored at the application server 240 may indicate that one or more other viewers are associated with the viewers as "friends" in terms of social networking. The storing module 340 stores content utilization data collected from client devices of the viewer's "friends" or social connections in a repository termed a social bucket. The customization module 330 may utilize data from the viewer's personal bucket and the viewer's social bucket to generate the customized playlist. The customization module 330 may be configured to periodically update the customized playlist, e.g., based on the changes in the hot list, based on the changes in the data stored in the personal bucket and the social bucket, as well as based on the changes in the viewer's profile.

In one embodiment, a customized playlist is generated by generating a score for each item from the list of popular content items and including items into in the customized playlist based on respective scores of the items from the list of popular content items. The scoring may be based on the viewer's preferences identified in the viewer's profile, based on data from the viewer's personal bucket and the viewer's social bucket. A content item from a category that is not indicated in the viewer's profile as being of interest to the viewer and that is not considered as being of interest to the viewer based on the viewing history of the viewer may still be assigned a high score by the customization module 330 based on the information from the viewers social bucket. For example, the customization module 330 may be configured to weigh heavily an indication that a certain content item is of high interest to a great number of the viewer's social contacts.

The communications module 350 may be configured to communicate the customized playlist to a client device of the target viewer. The communications module 350 may be configured to communicate to the client device an instruction to start recording of a live program identified in the customized playlist. The communications module 350 may also be configured to communicate to the client device an instruction to display an alert message regarding of a live program identified in the customized playlist. As mentioned above, a client device may be a set top box, a desktop computer, or a mobile device. Content items referenced in the hot list or in the customized playlist may be associated with a variety of content sources, such as, e.g., the Internet, video on demand, and live broadcast. Example operations performed by the system 400 may be described with reference to FIG. 4.

Figure 4:
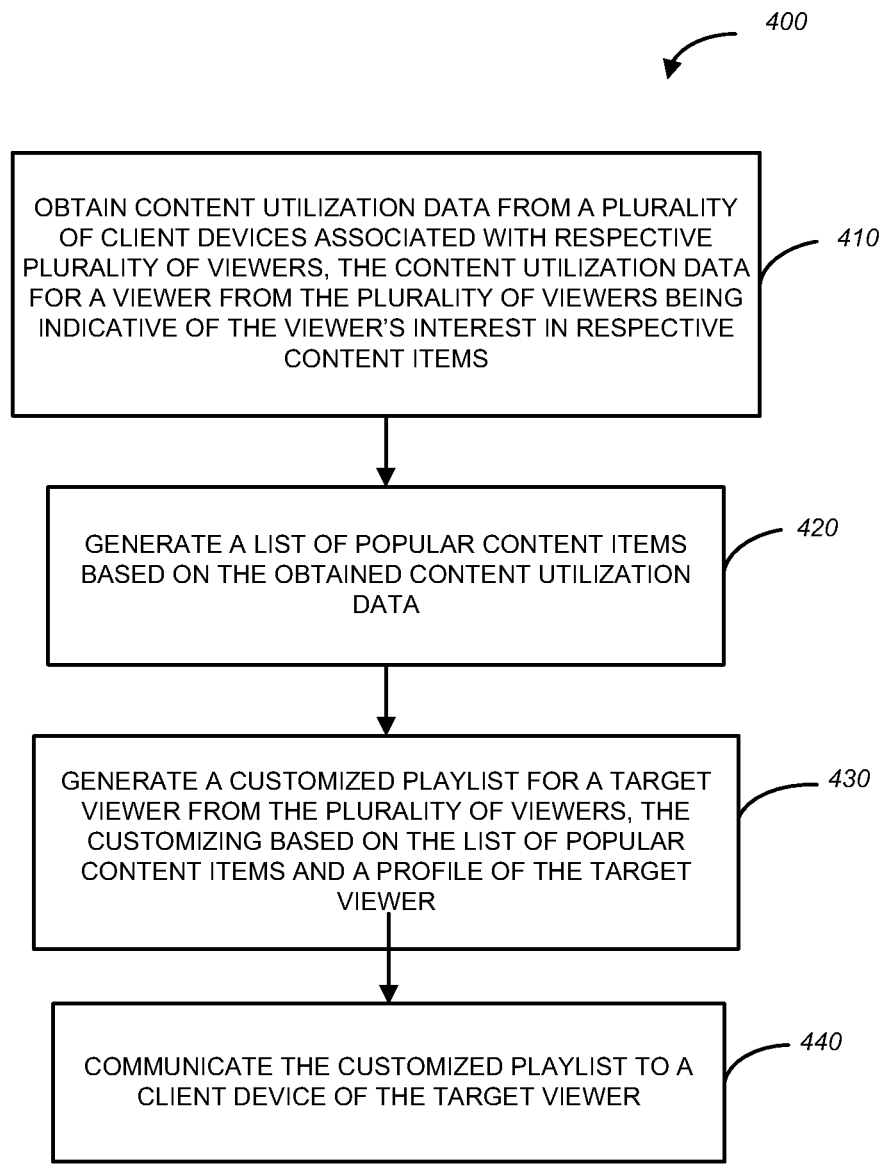
FIG. 4 is a flow chart illustrating a method for providing a smart playlist to a viewer's client device, in accordance with an example embodiment.

FIG. 4 illustrates an example method 400 of providing a smart playlist. The method 400 may be performed in the context of media and entertainment, e.g., in the context of television entertainment. The method 400 may be performed by processing logic that may comprise hardware (e.g., dedicated logic, programmable logic, microcode, etc.), software (such as run on a general purpose computer system or a dedicated machine), or a combination of both. It will be noted, that, in an example embodiment, the processing logic may reside in any of the modules shown in FIG. 3.

As shown in FIG. 4, the method 400 commences with operation 410, where the collector module 310 of FIG. 3 obtains content utilization data from a plurality of client devices associated with respective plurality of viewers. At operation 420, the hot list generator 320 of FIG. 3 generates a list of popular content items based on the obtained content utilization data. At operation 430, the customization module 330 of FIG. 3 generates a customized playlist for a target viewer from the plurality of viewers, based on the list of popular content items and a profile of the target viewer. At operation 440, the communications module 340 of FIG. 3 communicates the customized playlist to a client device of the target viewer.

Figure 5:
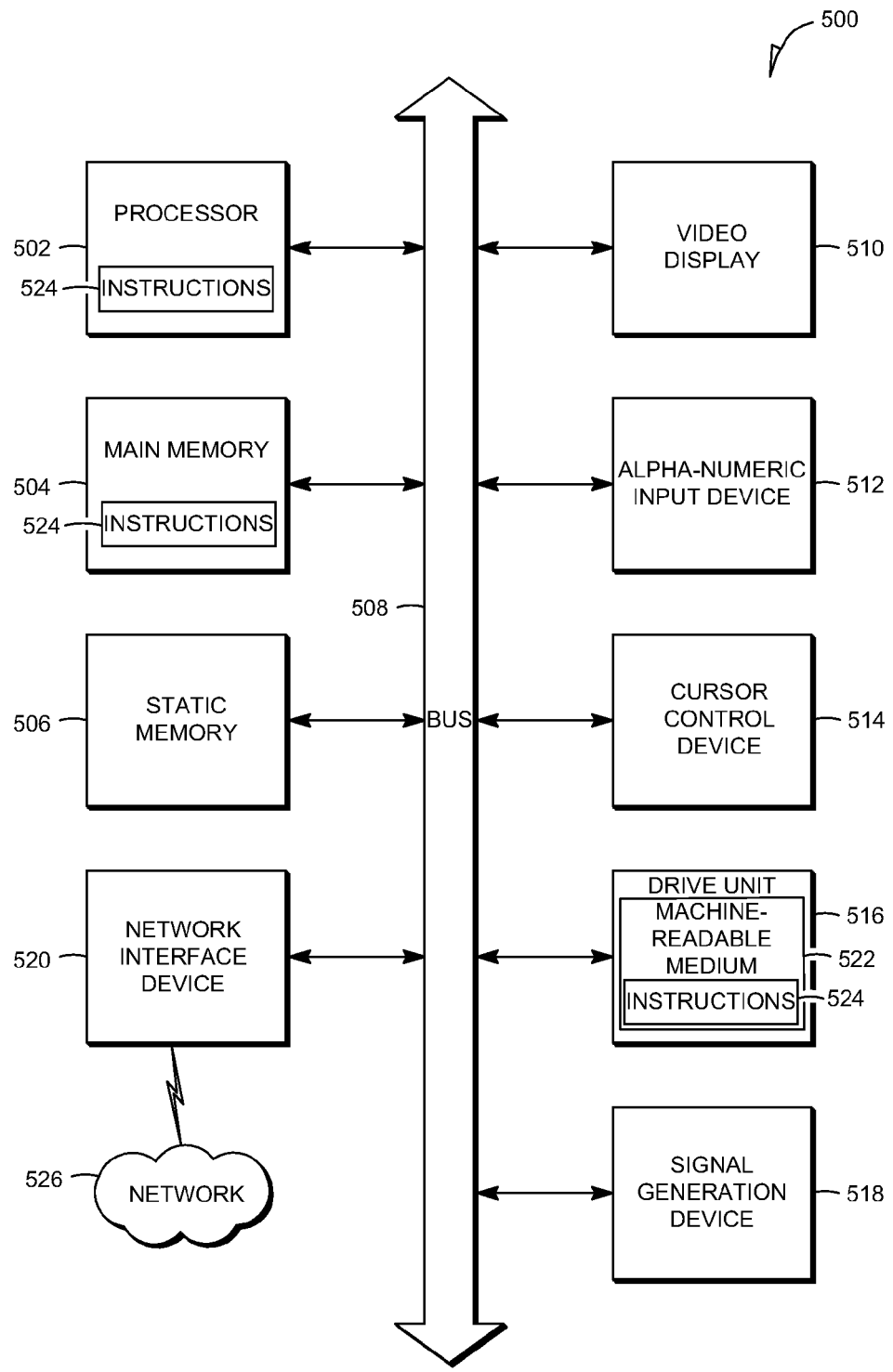
FIG. 5 illustrates a diagrammatic representation of a machine in the example form of a computer system within which a set of instructions, for causing the machine to perform any one or more of the methodologies discussed herein, may be executed.

FIG. 5 shows a diagrammatic representation of machine in the example form of a computer system within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 500 includes a processor 502 (e.g., a central processing unit (CPU), a graphics processing unit (GPU) or both), a main memory 504 and a static memory 506, which communicate with each other via a bus 508. The computer system 500 may further include a video display unit 510 (e.g., a liquid crystal display (LCD) or a cathode ray tube (CRT)). The computer system 500 also includes an alphanumeric input device 512 (e.g., a real or virtual keyboard), a viewer interface (UI) navigation device 514 (e.g., a remote control or a mouse), a disk drive unit 516, a signal generation device 518 (e.g., a speaker) and a network interface device 520.

The disk drive unit 516 includes a machine-readable medium 522 on which is stored one or more sets of instructions and data structures (e.g., software 524) embodying or utilized by any one or more of the methodologies or functions described herein. The software 524 may also reside, completely or at least partially, within the main memory 504, within the processor 502 during execution thereof by the computer system 500, the main memory 504 and the processor 502 also constituting machine-readable media. The main memory 504 comprises storage locations that are addressable by the processor 502 for storing software program code. The memory may comprise a form of random access memory (RAM). Those skilled in the art will appreciate that other memory means, such as FLASH memory media, may also be used for storing the program instructions and data structures shown in the main memory 504.

The software 524 may further be transmitted or received over a network 526 via the network interface device 520 utilizing any one of a number of well-known transfer protocols (e.g., HTTP).

While the machine-readable medium 522 is shown in an example embodiment to be a single medium, the term "machine-readable medium" may be taken to include a single medium or multiple media (e.g., a centralized or distributed database, and/or associated caches and servers) that store the one or more sets of instructions. The term "machine-readable medium" shall also be taken to include any medium (e.g., FLASH memory media) that is capable of storing, encoding or carrying a set of instructions for execution by the machine and that cause the machine to perform any one or more of the methodologies of the present invention, or that is capable of storing, encoding or carrying data structures utilized by or associated with such a set of instructions. The term "machine-readable medium" shall accordingly be taken to include, but not be limited to, solid-state memories, optical and magnetic media.

The embodiments described herein may be implemented in an operating environment comprising software installed on a computer, in hardware, or in a combination of software and hardware.

Thus, method and system to generate and update a smart playlist have been described. In the description above, for purposes of explanation, numerous specific details have been set forth in order to provide a thorough understanding of one example embodiment. It will be evident, however, to one skilled in the art that the present invention may be practiced without these specific details. It is to be noted that the delivery mechanism for the content for viewing may be via a satellite, cable, terrestrial broadcast, Internet, local storage, a local network, mobile telephony, or any other content distribution network. Accordingly, the viewing device need not be a television set but may be any display unit of any device (including portable devices). It will be noted that any references to television content will be understood to include any content available for viewing on an entertainment display device, such as a television screen. Such content may include television programming, as well as locally stored content, such as stored video files or digital images, as well as content accessible via the Internet. It will be noted that the term viewer may be understood broadly as any viewer of the system to navigate television content.

The invention claimed is:

1. A computer-implemented method comprising:
   obtaining content utilization data from a plurality of client devices associated with a respective plurality of viewers, wherein the content utilization data for a viewer from the plurality of viewers is indicative of the viewer's interest in respective content items, and wherein the plurality of viewers comprises other viewers who are not identified as social connections of the viewer;
   automatically generating, at a server computer system, a list of popular content items that are currently popular among the plurality of viewers based on the obtained content utilization data;
   for a target viewer from the plurality of viewers, customizing the list of popular content items to generate a customized playlist, the customizing based on a viewing history of the target viewer and on a viewing history of viewers who are identified as social connections of the target viewer, wherein the customizing comprises:
      generating a score for each item from the list of popular content items based on the viewing history of the target viewer and on the viewing history of the viewers who are identified as social connections of the target viewer; and
      including items in the customized playlist based on the respective scores of the items from the list of popular content items; and
   communicating the customized playlist to a client device of the target viewer.

2. The method of claim 1, wherein the customizing comprises selecting at least one of the popular content items for the customized playlist based on the viewing history of the viewers who are identified as social connections of the target viewer indicating a high level of interest in the at least one of the popular content items among the social connections of the target viewer while the viewing history of the target viewer indicates a low level of interest in the at least one of the popular content items by the target viewer.

3. The method of claim 1, wherein the communicating of the customized playlist to the client device of the target viewer comprises communicating an instruction to start recording of a live program identified in the customized playlist.

4. The method of claim 1, wherein the communicating of the customized playlist to the client device of the target viewer comprises communicating an instruction to display an alert message regarding a live program identified in the customized playlist.

5. The method of claim 1, wherein the items in the customized playlist include at least one of a first item that identifies Internet content, a second item that identifies video on demand content, and a third item that identifies a live program.

6. The method of claim 1, wherein the client device comprises a set top box.

7. The method of claim 1, wherein the client device comprises a desktop computer.

8. The method of claim 1, wherein the client device comprises a mobile device.

9. A computer-implemented system comprising:
   a collector module to obtain content utilization data from a plurality of client devices associated with a respective plurality of viewers, wherein the content utilization data for a viewer from the plurality of viewers is indicative of the viewer's interest in respective content items, and wherein the plurality of viewers comprises other viewers who are not identified as social connections of the viewer;
   a hot list generator to generate a list of popular content items that are currently popular among the plurality of viewers based on the obtained content utilization data;
   a customization module to generate a customized playlist for a target viewer from the plurality of viewers, the customizing based on the list of popular content items, a viewing history of the target viewer, and a viewing history of viewers who are identified as social connections of the target viewer, wherein the customization module is to:
      generate a score for each item from the list of popular content items based on the viewing history of the target viewer and on the viewing history of the viewers who are identified as social connections of the target viewer; and
      include items in the customized playlist based on respective scores of the items from the list of popular content items; and
   a communications module to communicate the customized playlist to a client device of the target viewer.

10. The system of claim 9, wherein the customization module is to select at least one of the popular content items for the customized playlist based on the viewing history of the viewers who are identified as social connections of the target viewer indicating a high level of interest in the at least one of the popular content items among the social connections of the target viewer while the viewing history of the target viewer indicates a low level of interest in the at least one of the popular content items by the target viewer.

11. The system of claim 9, wherein the communications module is to communicate to the client device an instruction to start recording of a live program identified in the customized playlist.

12. The system of claim 9, wherein the communications module is to communicate to the client device an instruction to display an alert message regarding a live program identified in the customized playlist.

13. The system of claim 9 wherein the items in the customized playlist include at least one of a first item that identifies Internet content, a second item that identifies video on demand content, and a third item that identifies a live program.

14. The system of claim 9, wherein the client device comprises a set top box.

15. The system of claim 9, wherein the client device comprises a desktop computer or a mobile device.

16. A machine-readable non-transitory storage medium storing instructions that, when executed by one or ore processors of a machine, cause the machine to perform operations comprising:
   obtaining content utilization data from a plurality of client devices associated with a respective plurality of viewers, wherein the content utilization data for a viewer from the plurality of viewers is indicative of the viewer's interest in respective content items, and wherein the plurality of viewers comprises other viewers who are not identified as social connections of the viewer;
   generating a list of popular content items that are currently popular among the plurality of viewers based on the obtained content utilization data;
   generating a customized playlist for a target viewer from the plurality of viewers, the customizing based on the list of popular content items, a viewing history of the target viewer, and a viewing history of viewers who are identified as social connections of the target viewer, wherein the customizing comprises:
      generating a score for each item from the list of popular content items based on the viewing history of the target viewer and on the viewing history of the viewers who are identified as social connections of the target viewer; and
      including items in the customized playlist based on the respective scores of the items from the list of popular content items; and
   communicating the customized playlist to a client device of the target viewer.

17. The method of claim 1, the customizing of the list of popular content items also being based at least in part on a content category of interest to the target viewer.

18. The method of claim 1, the obtained content utilization data indicating lengths of time during which the plurality of viewers have viewed a content item.

* * * * *

UNITED STATES PATENT AND TRADEMARK OFFICE
CERTIFICATE OF CORRECTION

PATENT NO. : 9,699,503 B2
APPLICATION NO. : 12/877034
DATED : July 4, 2017
INVENTOR(S) : Fishman et al.

Page 1 of 1

It is certified that error appears in the above-identified patent and that said Letters Patent is hereby corrected as shown below:

In the Claims

In Column 11, Line 9, in Claim 16, delete "ore" and insert --more-- therefor

Signed and Sealed this
Tenth Day of April, 2018

Andrei Iancu
*Director of the United States Patent and Trademark Office*